(12) United States Patent
Venkatraman et al.

(10) Patent No.: US 11,747,487 B2
(45) Date of Patent: Sep. 5, 2023

(54) GNSS RECEIVER CLOCK FREQUENCY DRIFT DETECTION

(71) Applicant: Texas Instruments Incorporated, Dallas, TX (US)

(72) Inventors: Sashidharan Venkatraman, Bengaluru (IN); Sandeep Rao, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 336 days.

(21) Appl. No.: 15/935,071

(22) Filed: Mar. 26, 2018

(65) Prior Publication Data
US 2019/0293804 A1  Sep. 26, 2019

(51) Int. Cl.
| G01S 19/42 | (2010.01) |
| G01S 19/23 | (2010.01) |
| G01S 19/52 | (2010.01) |
| G01S 19/37 | (2010.01) |
| G01S 19/22 | (2010.01) |

(52) U.S. Cl.
CPC .............. *G01S 19/42* (2013.01); *G01S 19/23* (2013.01); *G01S 19/37* (2013.01); *G01S 19/52* (2013.01); *G01S 19/22* (2013.01)

(58) Field of Classification Search
CPC ........ G01S 19/23; G01S 19/235; G01S 19/39; G01S 19/393
See application file for complete search history.

(56) References Cited

U.S. PATENT DOCUMENTS

| 6,642,884 | B2 * | 11/2003 | Bryant | G01S 19/24 342/357.64 |
| 6,664,923 | B1 * | 12/2003 | Ford | G01S 19/44 342/357.59 |
| 7,576,689 | B2 * | 8/2009 | Weedon | G01S 5/0221 342/357.62 |
| 8,212,720 | B2 * | 7/2012 | Waters | G01S 19/235 342/357.42 |
| 8,525,727 | B2 * | 9/2013 | Roh | G01S 19/22 342/357.77 |
| 2006/0195262 | A1 * | 8/2006 | Draganov | G01S 19/43 701/472 |
| 2011/0254729 | A1 * | 10/2011 | Dutta | G01S 19/20 342/357.3 |

(Continued)

OTHER PUBLICATIONS

Zhang et al. "Influence of Clock Jump on the Velocity and Acceleration Estimation with a Single GPS Receiver Based on Carrier-phase-derived-Doppler" GPS Solutions. 2012. pp. 549-559. (Year: 2012).*

(Continued)

*Primary Examiner* — Gregory C. Issing
(74) *Attorney, Agent, or Firm* — John R. Pessetto; Frank D. Cimino

(57) ABSTRACT

The disclosure provides a GNSS receiver. The GNSS receiver a measurement engine that generates a set of doppler measurements and a set of pseudo ranges in response to an input signal. A clock frequency drift estimation (CFDE) block receives the set of doppler measurements, and generates an averaged delta doppler. A position estimation engine estimates a position and velocity of a user based on the set of doppler measurements, the set of pseudo ranges and the averaged delta doppler.

15 Claims, 5 Drawing Sheets

(56) References Cited

U.S. PATENT DOCUMENTS

2017/0097422 A1* 4/2017 Fernandez-Hernandez ................. G01S 19/42

OTHER PUBLICATIONS

He, K. (2015), DGNSS Kinematic Position and Velocity Determination for Airborne Gravimetry. Scientific Technical Report 15/04, GFZ German Research Centre for Geosciences. doi: 10.2312/GFZ.b103-15044 (Year: 2015).*

Zair et al. "Outlier Detection in GNSS Pseudo-Range/Doppler Measurements for Robust Localization" Sensor 2016. pp. 1-22. (Year: 2016).*

Bahrami, M. "GNSS Doppler Positioning (An Overview)". GNSS SIG Technical Reading Group. University College London. Aug. 2008. pp. 1-17. (Year: 2008).*

Kaniewski et al. "Algorithms of Position and Velocity Estimation in GPS Receivers". Annual of Navigation 23/2016. pp. 53-68. (Year: 2016).*

* cited by examiner

GNSS RECEIVER CLOCK FREQUENCY DRIFT DETECTION

TECHNICAL FIELD

The present disclosure is generally related to wireless receivers and more particularly to global navigation satellite system (GNSS) receivers.

BACKGROUND

Global navigation satellite systems (GNSS) are broadly defined to include GPS (U.S.), Galileo (proposed), GLONASS (Russia), Beidou (China), IRNSS (India, proposed), QZSS (Japan, proposed) and other current and future positioning technologies using signals from satellites, with or without augmentation from terrestrial sources. Information from GNSS is being increasingly used for computing a user's positional information (e.g., a location, a speed, a direction of travel, etc.).

In GNSS, multiple satellites may be present, with each transmitting a satellite signal. A received signal at a GNSS receiver contains one or more of the transmitted satellite signals. To obtain the information from the respective transmitted signals, the GNSS receiver performs a signal acquisition/tracking procedure. More specifically, the GNSS receiver searches for the corresponding transmitted satellite signals in the received signal and, then locks onto them for subsequent tracking of the corresponding satellites to receive the satellite information. Fast signal acquisition plays an important role in achieving faster determination of user's position and velocity.

The measurement of user's position and velocity is also a function of offset between a GNSS receiver clock and a clock of synchronized satellites. The drift in clock frequency results from a change in ambient temperature and similar other factors. This drift results in discrepancy in measured position and velocity of the user, and hence degrades the performance of the GNSS receiver.

SUMMARY

According to an aspect of the disclosure, a GNSS receiver is disclosed. The GNSS receiver includes a measurement engine that generates a set of doppler measurements and a set of pseudo ranges in response to an input signal. A clock frequency drift estimation (CFDE) block receives the set of doppler measurements, and generates an averaged delta doppler. A position estimation engine estimates a position and velocity of a user based on the set of doppler measurements, the set of pseudo ranges and the averaged delta doppler.

BRIEF DESCRIPTION OF THE VIEWS OF DRAWINGS

Figure 5:
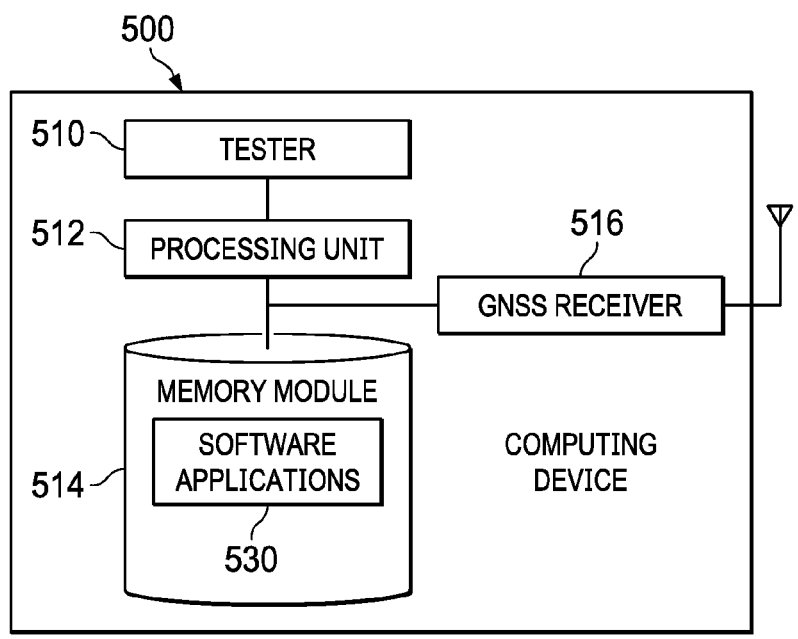
Figure 4:
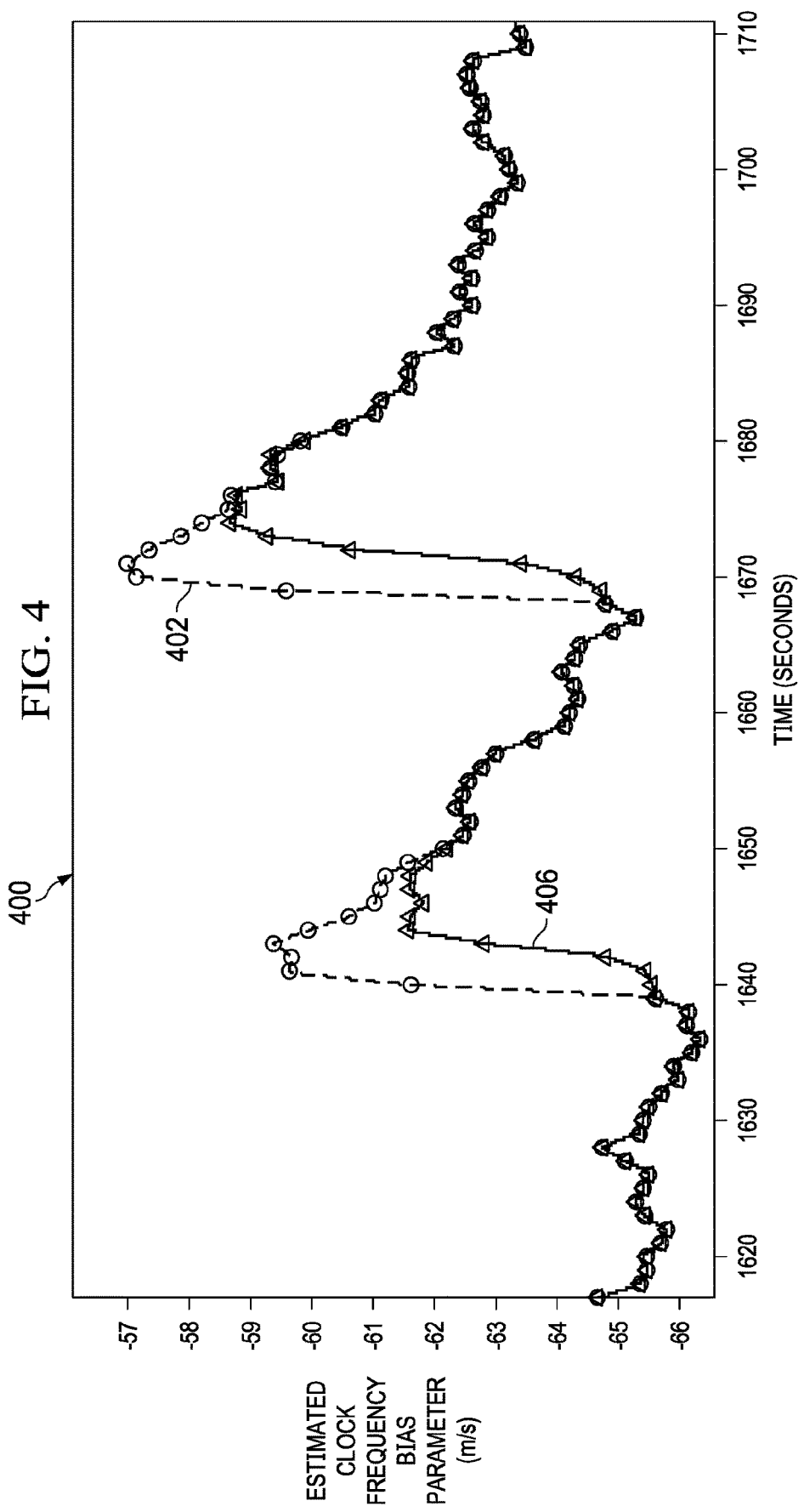

FIG. 4 graphically illustrate estimation of drift in clock frequency in a GNSS receiver, according to an embodiment; and FIG. 5 illustrates a computing device, according to an embodiment.

Figure 6:
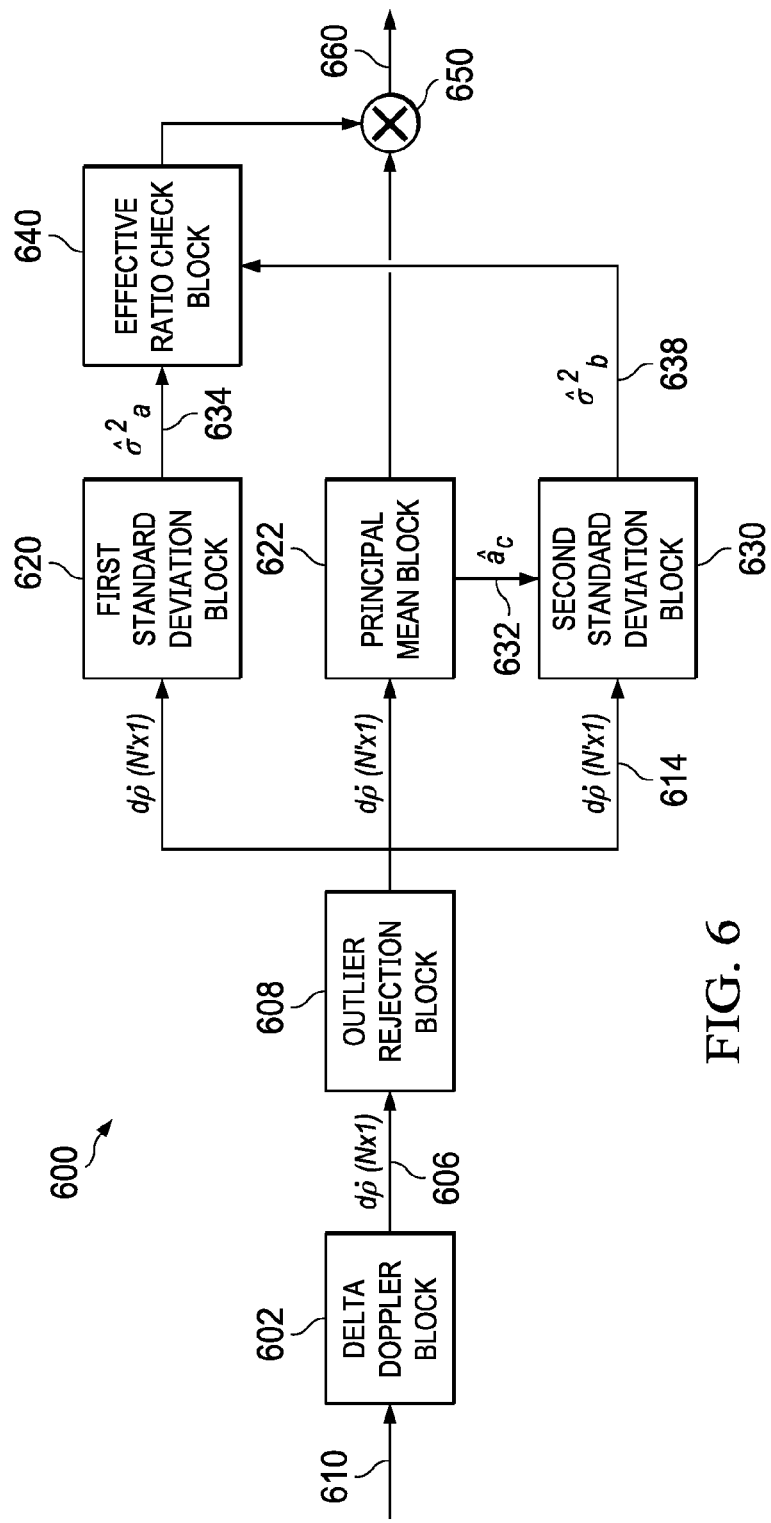
Figure 7:
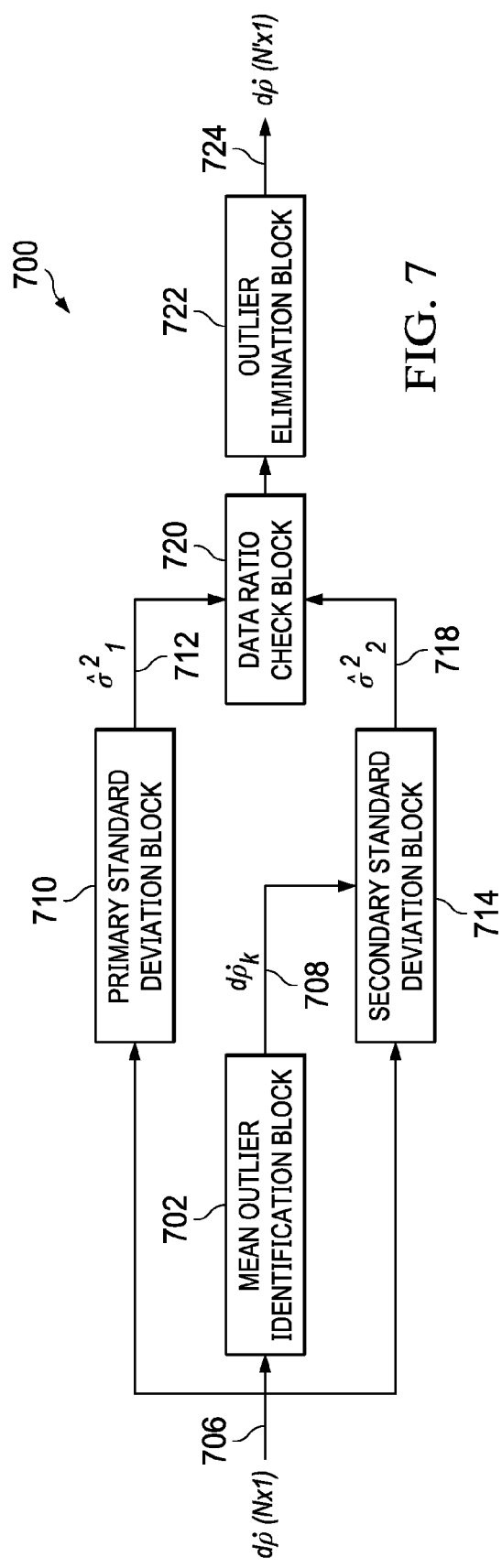
Figure 8:
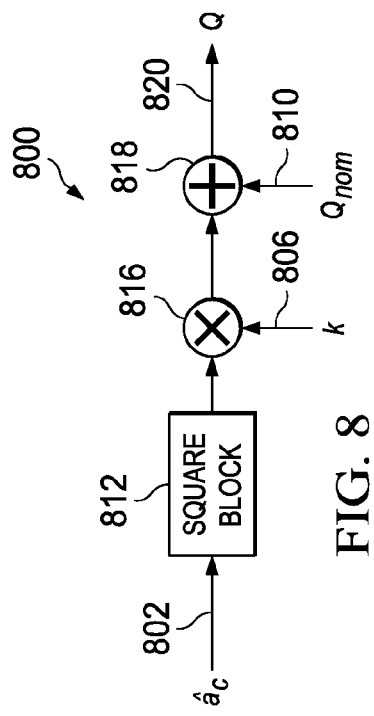

FIG. 6 illustrate a CFDE block, according to an embodiment;

FIG. 7 illustrate an outlier rejection block, according to an embodiment;

FIG. 8 illustrate an adaptive block, according to an embodiment.

DETAILED DESCRIPTION OF THE EMBODIMENTS

Figure 1:
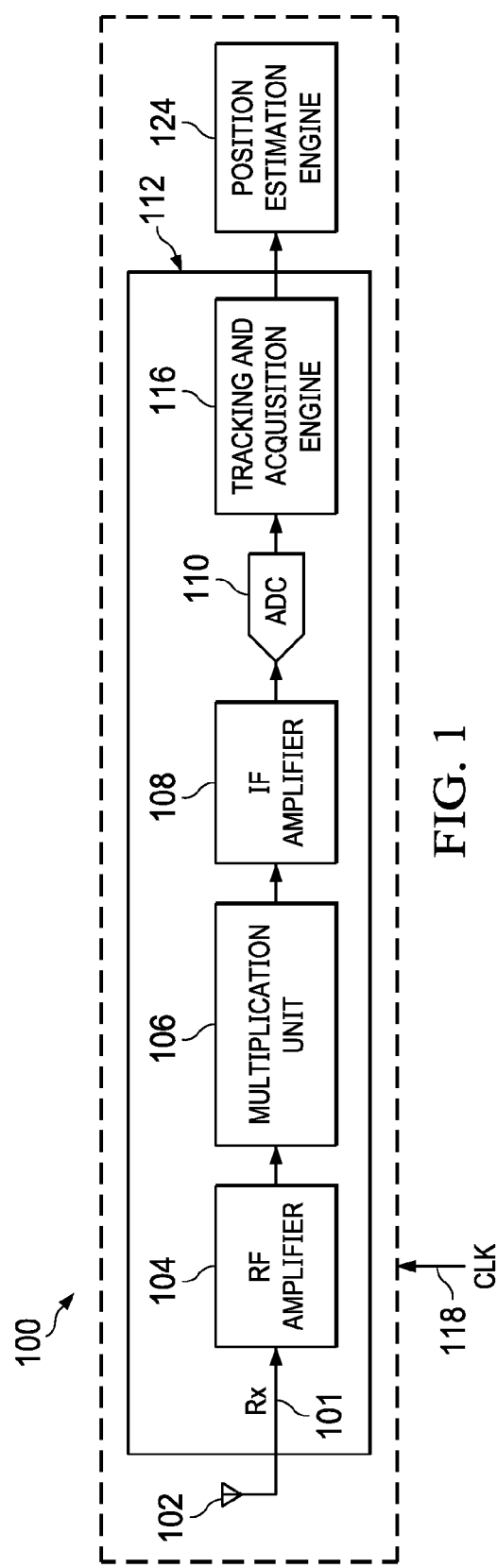
FIG. 1 illustrates a schematic of a global navigation satellite system (GNSS) receiver, in which several aspect of the present disclosure can be implemented.

FIG. 1 illustrates a schematic of a global navigation satellite system (GNSS) receiver 100, in which several aspect of the present disclosure can be implemented. The GNSS receiver 100 receives a plurality of satellite signals from a plurality of GNSS satellites. The GNSS satellites are man-made earth orbiting devices used for receiving or transmitting signals. The GNSS receiver in one embodiment receives GNSS satellite signals from multiple satellites belonging to multiple satellite systems such as a Global positioning system (GPS), a Global navigation satellite system (GLONASS) and the like, and which are commonly referred to as GNSS.

The GNSS receiver 100 in FIG. 1 includes an antenna 102 and an RF (radio frequency) amplifier 104 coupled to the antenna 102. A multiplication unit 106 receives output of the RF amplifier 104. The multiplication unit 106 is coupled to an IF (intermediate frequency) amplifier 108. An ADC (analog to digital converter) 110 receives output of the IF filter. A tracking and acquisition engine 116 receives output of the ADC 110. A position estimation engine 124 receives output of the tracking and acquisition engine 116. The RF amplifier 104, the multiplication unit 106, the IF amplifier 108, the ADC 110 and the tracking and acquisition engine 116 constitutes a measurement engine 112. The GNSS receiver 100 receives a clock CLK 118 from a clock source.

The operation of the GNSS receiver 100 illustrated in FIG. 1 is now explained. The antenna 102 receives plurality of satellite signals from GNSS satellites in one or more satellite systems such as GPS, GLONASS, Galileo and the like. The RF amplifier 104 receives an input signal Rx 101. The RF amplifier 104 removes unwanted input frequencies from the input signal Rx 101 and amplifies the input signal Rx 101 using filters. A low noise amplifier in the RF amplifier 104 downconverts the input signal Rx 101 to a lower frequency. The multiplication unit 106 multiplies the signal received from RF amplifier 104 with $e^{(-j2\pi ft)}$ to synchronize with a characteristic PN code of a corresponding satellite, where f is carrier frequency and t is time. The IF amplifier 108 receives output of the multiplication unit 106. The IF amplifier 108 performs one or more level of down conversion of the signal received from the multiplication unit 106 to a lower frequency (intermediate frequency) signal. In addition, the IF amplifier 108 remove unwanted harmonics using filters and amplifies the resulting IF signal.

The IF signal from the IF amplifier 108 is received at ADC 110. The ADC 110 is samples the IF signal to generate a plurality of corresponding digital samples. The sampling rate of the ADC 110 is selected to be sufficiently high such that the PN code and data information in the IF signal is preserved. The ADC 110 provides the plurality of samples corresponding to the IF signal to the tracking and acquisition engine 116.

To obtain the information from the respective transmitted signals, the GNSS receiver 100 performs a signal acquisition/tracking procedure through the tracking and acquisition engine 116. More specifically, the tracking and acquisition engine 116 searches for the corresponding transmitted signals in the plurality of samples from the ADC 110 and then locks onto them for subsequent tracking of the corresponding satellites to receive the satellite information. The signal acquisition/tracking procedure includes correlating a sample from the ADC 110 with a corresponding local signal generated within the GNSS receiver 100. For example, in GPS satellite system, each GNSS satellite repeatedly transmits a unique 1023 bit PN code of duration 1 millisecond. The GNSS receiver 100 generates local signals and modulates each local signal with the unique PN code corresponding to the each GNSS satellite signals to produce replica local signals. The plurality of samples from the ADC 110 is then matched with the replica local signals to detect presence of corresponding GNSS satellite signal for subsequent tracking of the corresponding GNSS satellite to receive satellite information. After locking onto or acquiring a minimum of four GNSS satellites, the position estimation engine 124 computes a user position and velocity by triangulation. The tracking and acquisition engine 116 generates a set of doppler measurements and a set of pseudo ranges corresponding to the plurality of satellites, which are used by the position estimation engine 124 to estimate a position and velocity of the user.

The position estimation engine 124 computes the user's position and velocity by applying a transformation on the set of doppler measurements and the set of pseudo ranges corresponding to the plurality of satellites. The position estimation engine 124 processes these measurements from different satellites based on one or more factors to calculate the user's position and velocity. The one or more factors include at least one of power level measurements, code phase and frequency measurements.

Figure 2:
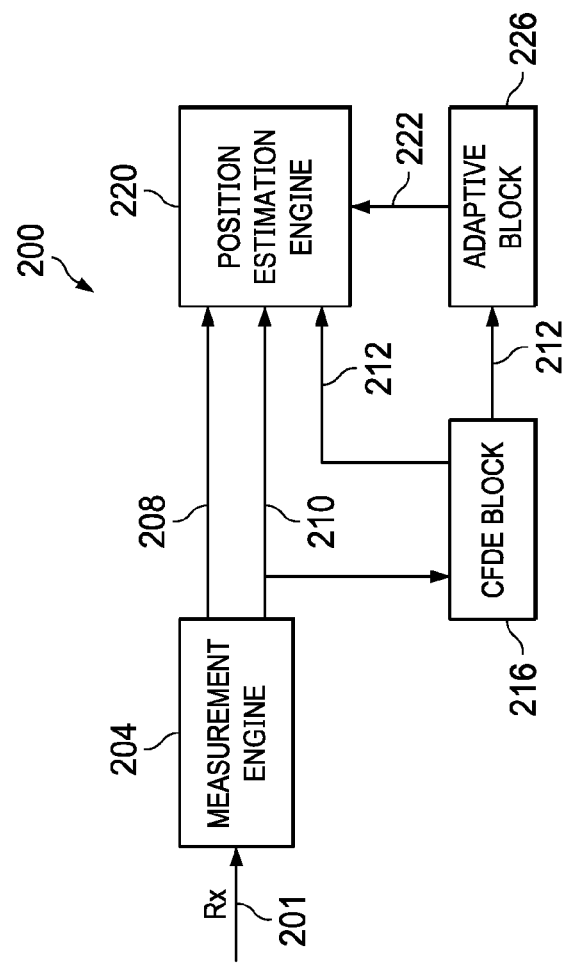
FIG. 2 illustrates a block diagram of a global navigation satellite system (GNSS) receiver, according to an embodiment.

FIG. 2 illustrates a block diagram of a global navigation satellite system (GNSS) receiver 200, according to an embodiment. The GNSS receiver 200 includes a measurement engine 204, a clock frequency drift estimation (CFDE) block 216, an adaptive block 226 and a position estimation engine 220. The CFDE block 216 is coupled to the measurement engine 204. The adaptive block 226 is coupled to the CFDE block 216. The position estimation engine 220 is coupled to the measurement engine 204, the CFDE block 216 and the adaptive block 226. The GNSS receiver may include one or more additional components known to those skilled in the relevant art and are not discussed here for simplicity of the description.

The operation of the GNSS receiver 200 illustrated in FIG. 2 is explained now. In the GNSS receiver 200, the measurement engine 204 receives an input signal Rx 201. The input signal Rx 201 includes a plurality of satellite signals from GNSS satellites in one or more satellite systems such as GPS, GLONASS, Galileo and the like. The measurement engine 204 is analogous in connection and operation to the measurement engine 112 illustrated in FIG. 1. The measurement engine 204 includes some or all the components illustrated in the measurement engine 112. The measurement engine 204 also receives the clock CLK 118 from a clock source. The measurement engine 204 generates a set of doppler measurements 210 and a set of pseudo ranges 208 in response to the input signal Rx 201.

The set of doppler measurements 210 and the set of pseudo ranges 208 corresponds to the plurality of satellites. Hence, a doppler measurement of the set of doppler measurements 210 correspond to a satellite of the plurality of satellites. For example, a first doppler measurement of the set of doppler measurements 210 correspond to a first satellite of the plurality of satellites.

Doppler measurements ($\dot{\rho}$) from a satellite at time instants n and n−1 are defined as:

$$\dot{\rho}_n = h \cdot (v_{s,n} - v_n) + cd_n + n_{v,n} \quad (1)$$

$$\dot{\rho}_{n-1} = h \cdot (v_{s,n-1} - v_{n-1}) + cd_{n-1} + n_{v,n-1} \quad (2)$$

where $v_n$ denotes the 3×1 user velocity in ECEF (earth-centered, earth-fixed) coordinates at time instant 'n'; a clock frequency bias parameter at time instant n is denoted by $cd_n$, h is a 3×1 user-to-satellite unit vector, $n_{v,n}$ is a measurement noise at the time instant n, $v_{s,n}$ is the satellite velocity in ECEF coordinates corresponding to the signal received at the time instant in. The clock frequency bias parameter $cd_n$ is typically expressed in Hertz. However, in the equations (1) and (2), this parameter is expressed in units of velocity after applying a scaling of c/f, where c is speed of light and f represents carrier frequency.

The CFDE block 216 receives the set of doppler measurements 210 and generates an averaged delta doppler 212. The CFDE block 216 measures a delta doppler for the satellite at multiple time instants to generate a plurality of delta dopplers. The measurement of delta doppler of a satellite, in one version, is measured from a difference between two doppler measurements illustrated in equation 1 and 2. The delta doppler is defined as:

$$d\dot{\rho}_n = h \cdot (v_{s,n} - v_{s,n-1}) + h \cdot (v_n - v_{n-1}) + (cd_n - cd_{n-1}) + (n_{v,n} - n_{v,n-1}) \quad (3)$$

The first term in the above equation represents the satellite acceleration from time instant n−1 to time instant n along the line-of-sight. The second term in the above equation represents the effect of user acceleration, henceforth denoted as $a_{v,n}$. The third term in the above equation represents clock frequency drift or clock acceleration of the clock CLK 118, henceforth denoted as $a_{c,n}$. The clock frequency drift $a_{c,n}$ is typically expressed in Hertz per second. However, in the equation (3), this parameter is expressed in units of acceleration after applying a scaling of c/f, where c is speed of light, and f represents carrier frequency. The first term in the above equation is negligible as compared to other terms. Hence, ignoring the first term and combining measurements from N satellites, the equation 3 is represented as:

$$d\underline{\dot{\rho}}_n = H a_{v,n} + \underline{1} a_{c,n} + \underline{n} \quad (4)$$

where N is an integer and represent a number of satellites, H is a N×3 matrix whose rows are the h vectors for each satellite; $\underline{1}$ is a N×1 vector of 1's. The term $\underline{n}$ represents an effective noise on these delta doppler measurements.

The CFDE block 216 detects one or more outlier delta dopplers in the plurality of delta dopplers. The CFDE block 216 also eliminates the one or more outlier delta doppler in the plurality of delta dopplers. For detection of a first outlier delta doppler of the one or more outlier delta dopplers, the CFDE block 216 measures a primary standard deviation and a mean of the plurality of delta dopplers. A difference in each delta doppler and the mean of the plurality of delta dopplers is measured. A delta doppler of the plurality of delta dopplers for which the difference is maximum is identified.

To eliminate the one or more outlier delta dopplers in the plurality of delta dopplers, the CFDE block 216 measures a secondary standard deviation of the plurality of delta dopplers excluding the delta doppler for which the difference is maximum. The CFDE block 216 measures a data ratio from the primary standard deviation and the secondary standard deviation. The data ratio is compared to a second threshold, and the delta doppler for which the difference is maximum is marked as an outlier delta doppler, when the data ratio is greater than the second threshold. The marked outlier delta doppler is eliminated by the CFDE block 216.

The CFDE block 216 detects a second outlier delta doppler of the one or more outlier delta dopplers when the data ratio is greater than the second threshold. In one version, the CFDE block 216 repeats the above process to eliminate other outlier delta dopplers until the data ratio is less than the second threshold. As an example, the process of identification and elimination of one or more outlier delta dopplers is now explained for N satellites.

The CFDE block 216 measures the mean of plurality of delta dopplers which is defined as:

$$\hat{a}_c = \frac{\sum_{i=1}^{N} d\dot{\rho}(i)}{N} \quad (5)$$

where N is an integer and represent a number of satellites.

The CFDE block 216 also measures a primary standard deviation which is defined as:

$$\hat{\sigma}_1^2 = \frac{\sum_{i=1}^{N} [d\dot{\rho}(i) - (\hat{a}_c)]^2}{N} \quad (6)$$

The CFDE block 216 measures a difference in each delta doppler and the mean of the plurality of delta dopplers. A delta doppler for which the difference is maximum is identified, and is defined as:

$$d\dot{\rho}(k) = \max(d\dot{\rho}(i) - (\hat{a}_c)) \quad (7)$$

To eliminate the one or more outlier delta dopplers in the plurality of delta dopplers, the CFDE block 216 measures a secondary standard deviation of the plurality of delta dopplers excluding the delta doppler $d\dot{\rho}(k)$ for which the difference is maximum. The secondary standard deviation is defined as:

$$\hat{\sigma}_2^2 = \frac{\sum_{i=1, i \neq k}^{N} [d\dot{\rho}(i) - (\hat{a}_{cf})]^2}{N} \quad (8)$$

where, $(\hat{a}_{cf})$ is defined as:

$$\hat{a}_{cf} = \frac{\sum_{i=1, i \neq k}^{N} d\dot{\rho}(i)}{N-1} \quad (9)$$

The CFDE block 216 measures a data ratio from the primary standard deviation and the secondary standard deviation. The data ratio is defined as:

$$\text{Data\_ratio} = \frac{\hat{\sigma}_1^2}{\hat{\sigma}_2^2} \quad (10)$$

The data ratio is compared to a second threshold. The delta doppler $d\dot{\rho}(k)$ for which the difference is maximum is marked as an outlier delta doppler, when the data ratio is greater than the second threshold. Thus delta doppler $d\dot{\rho}(k)$ is eliminated by the CFDE block 216. The CFDE block 216 repeats the above process to eliminate other outlier delta dopplers until the data ratio is less than the second threshold.

The CFDE block 216 measures a principal mean of remaining delta dopplers obtained after eliminating the one or more outlier delta dopplers from the plurality of delta dopplers. If N' a number of remaining delta dopplers from remaining satellites, the principal mean of the remaining delta dopplers is defined as:

$$\hat{a}_c = \frac{\sum_{i=1}^{N'} d\dot{\rho}(i)}{N'} \quad (11)$$

The CFDE block 216 measures a first standard deviation $(\hat{\sigma}_a^2)$ and a second standard deviation $(\hat{\sigma}_b^2)$, which are defined as:

$$\hat{\sigma}_a^2 = \frac{\sum_{i=1}^{N'} [d\dot{\rho}(i)]^2}{N'} \quad (12)$$

$$\hat{\sigma}_b^2 = \frac{\sum_{i=1}^{N'} [d\dot{\rho}(i)]^2}{N'} - (\hat{a}_c)^2 \quad (13)$$

The CFDE block 216 also measures an effective ratio, which is defined as:

$$\text{Effective\_Ratio} = \frac{\hat{\sigma}_a^2}{\hat{\sigma}_b^2} \quad (14)$$

The effective ratio defined in equation 14 is compared to a first threshold. The CFDE block 216 generates the principal mean $(\hat{a}_c)$ as the averaged delta doppler 212 when the effective ratio is greater than the first threshold. The averaged delta doppler 212 is a measurement of drift in clock frequency in the clock CLK 118 and is given by value of the principal mean $(\hat{a}_c)$.

The adaptive block 226 receives the averaged delta doppler 212 from the CFDE block 216. The adaptive block 226 generates a process noise parameter 222 in response to the averaged delta doppler 212. The process noise parameter 222 provides a bandwidth of the position estimation engine 220. The adaptive block 226, in one example, increases the bandwidth of the position estimation engine 220 based on the averaged delta doppler 212.

The position estimation engine 220 in one example is a Kalman filter. The position estimation engine 220 estimates a position and velocity of a user based on the set of doppler measurements 210, the set of pseudo ranges 208, the averaged delta doppler 212 and the process noise parameter 222. In one version, only the averaged delta doppler 212 is used to update a bias parameters of the Kalman filter. The parameters include the following, but not limited to, a clock time bias parameter and a clock frequency bias parameter.

In another version, the Kalman filter has 8 states corresponding to 3D user position (for example, x,y,z in ECEF coordinates), 3D user velocity (for example, vx, vy, vz velocity along the ECEF coordinated) and two states related to clock; one for clock time bias parameter (cb) and another for clock frequency bias parameter (cd). Each of these states has an associated process noise parameter, which is a measure of rate of change of these states with time. Increasing the process noise parameter for a given state results in faster tracking of changes in that state, but also allows more noise in the estimate. The process noise parameter 222 generated by the adaptive block 226 is used to modulate the clock states to enable improved estimation of the position and velocity of the user.

The averaged delta doppler 212 provides drift in clock frequency and hence used by the position estimation engine 220 to accurately estimate the position and velocity of the user. The GNSS receiver 200 estimates and corrects drift in clock frequency even in multipath environments. In multipath environment, when the user acceleration is negligible, any bias in the doppler measurements gets cancelled when a difference in two doppler measurements is performed to measure delta doppler of the satellite. The scheme of using standard deviation, as discussed in previous paragraphs, helps to detect periods of low user acceleration, and hence drift in clock frequency is reliably measured during such periods.

Additionally, if the GNSS receiver 200 is augmented with sensors like accelerometers, a magnitude of the acceleration measured by the accelerometer provides an additional check to detect the drift in the clock frequency. Thus, in addition to comparing the effective ratio with the first threshold, this additional check of comparing an average acceleration with a third threshold is performed. The CFDE block 216 generates the principal mean ($\hat{a}_c$) as the averaged delta doppler 212 when the effective ratio is greater than the first threshold and the average acceleration is less than the third threshold.

Hence, the GNSS receiver 200 provides improved navigation experience in urban canyons. The GNSS receiver 200 correctly measures drift in clock frequency even in absence of satellite ephemeris. Thus, it can be used to estimate quality of clock on start-up. A knowledge of the quality of the clock during start-up is used by the tracking and acquisition engine 116 to choose a coherent integration interval that is proportional to the quality of the clock i.e. better the quality of the clock, greater is the coherent integration time. The CFDE block 216 in the GNSS receiver 200 address the performance degradation observed due to clock frequency drifts. Also, it reduces restriction on quality of clock source that provides the clock CLK 118 to the GNSS receiver 200. It increases the robustness of the GNSS receiver 200 to poor quality of the clock. Typically a very stable clock source would require the clock to be isolated from potential heat sources on the board that can introduce drift in the clock frequency. The scheme enables relaxation of such requirement.

Figure 3:
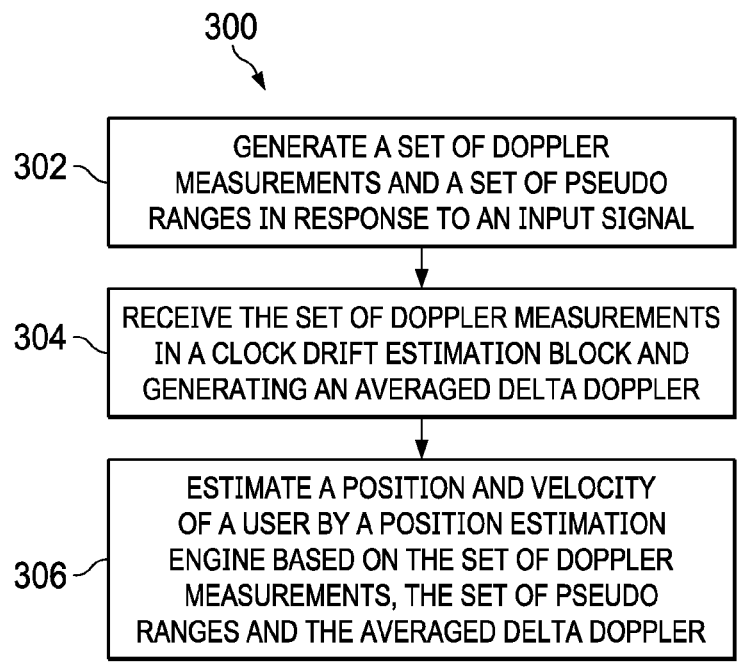
FIG. 3 is a flowchart to illustrate a method of operation of a GNSS receiver, according to an embodiment.

FIG. 3 is a flowchart 300 to illustrate a method of operation of a GNSS receiver, according to an embodiment. The flowchart 300 is explained in connection with the GNSS receiver 200 illustrated in FIG. 2. At step 302, a set of doppler measurements and a set of pseudo ranges are generated in response to an input signal. In GNSS receiver 200, the measurement engine 204 generates a set of doppler measurements 210 and a set of pseudo ranges 208 in response to the input signal Rx 201. The input signal Rx 201 includes a plurality of satellite signals from GNSS satellites in one or more satellite systems such as GPS, GLONASS, Galileo and the like. The set of doppler measurements 210 and the set of pseudo ranges 208 corresponds to the plurality of satellites.

At step 304, the set of doppler measurements are received in a clock frequency drift estimation block and an averaged delta doppler is generated. In GNSS receiver 200, the CFDE block 216 receives the set of doppler measurements 210 and generates an averaged delta doppler 212. The CFDE block 216 measures a delta doppler for the satellite at multiple time instants to generate a plurality of delta dopplers.

The CFDE block 216 detects one or more outlier delta dopplers in the plurality of delta dopplers. The CFDE block 216 also eliminates the one or more outlier delta doppler in the plurality of delta dopplers. For detection of a first outlier delta doppler of the one or more outlier delta dopplers, the CFDE block 216 measures a primary standard deviation and a mean of the plurality of delta dopplers. A difference in each delta doppler and the mean of the plurality of delta dopplers is measured. A delta doppler of the plurality of delta dopplers for which the difference is maximum is identified.

To eliminate the one or more outlier delta dopplers in the plurality of delta dopplers, the CFDE block 216 measures a secondary standard deviation of the plurality of delta dopplers excluding the delta doppler for which the difference is maximum. The CFDE block 216 measures a data ratio from the primary standard deviation and the secondary standard deviation. The data ratio is compared to a second threshold, and the delta doppler for which the difference is maximum is marked as an outlier delta doppler, when the data ratio is greater than the second threshold. The marked outlier delta doppler is eliminated by the CFDE block 216.

The CFDE block 216 detects a second outlier delta doppler of the one or more outlier delta dopplers when the data ratio is greater than the second threshold. In one version, the CFDE block 216 repeats the above process to eliminate other outlier delta dopplers until the data ratio is less than the second threshold. The CFDE block 216 measures a principal mean of remaining delta dopplers obtained after eliminating the one or more outlier delta dopplers from the plurality of delta dopplers.

The CFDE block 216 measures a first standard deviation and a second standard deviation, The CFDE block 216 also measures an effective ratio which is a ratio of the first standard deviation and the second standard deviation. The CFDE block 216 generates the principal mean as the averaged delta doppler 212 when the effective ratio is greater than a first threshold. The averaged delta doppler 212 is a measurement of drift in clock frequency and is given by value of the principal mean.

At step 306, a position and velocity of a user are estimated by a position estimation engine based on the set of doppler measurements, the set of pseudo ranges and the averaged delta doppler. In GNSS receiver 200, the position estimation engine 220 estimates a position and velocity of a user based on the set of doppler measurements 210, the set of pseudo ranges 208, the averaged delta doppler 212 and the process noise parameter 222. The position estimation engine 220 in one example is a Kalman filter.

The method illustrated by flowchart 300 accurately estimates the position and velocity of the user. It can be used to estimate and correct drift in clock frequency even in multipath environments. Hence, it provides an improved navigation experience in urban canyons. The method illustrated by flowchart 300 correctly measures drift in clock frequency even in absence of satellite ephemeris. Thus, it can be used to estimate quality of clock on start-up. A knowledge of the quality of the clock during start-up is used by the tracking and acquisition engine 116 to choose a coherent integration interval that is proportional to the quality of the clock i.e. better the quality of the clock, greater is the coherent integration time. The method addresses the performance degradation observed due to clock frequency drifts. Also, it reduces restriction on quality of clock source that provides the clock CLK 118 to the GNSS receiver 200. The method illustrated by the flowchart 300 increases the robustness of the GNSS receiver 200 to poor quality of the clock. Typically a very stable clock source would require the clock to be isolated from potential heat sources on the board that can introduce drift in the clock frequency. The method enables relaxation of such requirement.

FIG. 4 graphically illustrates estimation of drift in clock frequency in a GNSS receiver, according to an embodiment. The figure illustrates clock frequency bias parameter as a function of time in seconds. Graph 402 illustrates estimated clock frequency bias parameter in a GNSS receiver without the clock drift estimation scheme. Graph 406 illustrates estimated clock frequency bias parameter in a GNSS receiver with the clock drift estimation scheme as implemented in the GNSS receiver 200. The graph 406 illustrates that the GNSS receiver 200 is able to better track drift in clock frequency, and hence would provide an improved navigation experience as compared to the GNSS receiver represented by graph 402.

A better estimation of drift in clock frequency by the GNSS receiver 200 enables accurate estimation of the position and velocity of a user. Thus, the GNSS receiver illustrated by graph 406 is able to address the performance degradation observed due to clock frequency drifts as is the case with GNSS receiver represented by graph 402.

FIG. 5 illustrates a computing device 500 according to an embodiment. The computing device 500 is, or is incorporated into, a mobile communication device, such as a mobile phone, a personal digital assistant, a personal computer, or any other type of electronic system. The computing device 500 may include one or more additional components known to those skilled in the relevant art and are not discussed here for simplicity of the description.

In some embodiments, the computing device 500 comprises a megacell or a system-on-chip (SoC) which includes a processing unit 512 such as a CPU (Central Processing Unit), a memory module 514 (e.g., random access memory (RAM)) and a tester 510. The processing unit 512 can be, for example, a CISC-type (Complex Instruction Set Computer) CPU, RISC-type CPU (Reduced Instruction Set Computer), or a digital signal processor (DSP).

The memory module 514 (which can be memory such as RAM, flash memory, or disk storage) stores one or more software applications 530 (e.g., embedded applications) that, when executed by the processing unit 512, perform any suitable function associated with the computing device 500. The tester 510 comprises logic that supports testing and debugging of the computing device 500 executing the software application 530.

For example, the tester 510 can be used to emulate a defective or unavailable component(s) of the computing device 500 to allow verification of how the component(s), were it actually present on the computing device 500, would perform in various situations (e.g., how the component(s) would interact with the software application 530). In this way, the software application 530 can be debugged in an environment which resembles post-production operation.

The processing unit 512 typically comprises a memory and logic which store information frequently accessed from the memory module 514. The computing device 500 includes a GNSS receiver 516 which is capable of communicating with a plurality of satellites over a wireless network. The GNSS receiver 516 is coupled to the processing unit 512 and the memory module 514. The GNSS receiver 516 is used in detecting and tracking position and velocity of a user having the computing device 500. The GNSS receiver 516 is analogous to the GNSS receiver 200 in connections and operation. The GNSS receiver 516 includes a measurement engine, a clock frequency drift estimation block and a position estimation engine.

The measurement engine generates a set of doppler measurements and a set of pseudo ranges in response to an input signal. The input signal for example is similar to the input signal Rx 201 and includes a plurality of satellite signals from GNSS satellites in one or more satellite systems such as GPS, GLONASS, Galileo and the like. The set of doppler measurements and the set of pseudo ranges corresponds to the plurality of satellites.

The set of doppler measurements are received in a clock frequency drift estimation block and an averaged delta doppler is generated. A position and velocity of a user are estimated by a position estimation engine based on the set of doppler measurements, the set of pseudo ranges and the averaged delta doppler. The position estimation engine in one example is a Kalman filter.

The GNSS receiver 516 estimates and corrects drift in clock frequency even in multipath environments. Hence, the GNSS receiver 516 provides improved navigation experience in urban canyons. The GNSS receiver 516 correctly measures drift in clock frequency even in absence of satellite ephemeris. Thus, it can be used to estimate quality of clock on start-up. A knowledge of the quality of the clock during start-up is used by the tracking and acquisition engine 116 to choose a coherent integration interval that is proportional to the quality of the clock i.e. better the quality of the clock, greater is the coherent integration time. The clock frequency drift estimation block in the GNSS receiver 516 address the performance degradation observed due to clock frequency drifts.

FIG. 6 illustrate a CFDE block, according to an embodiment. The CFDE block 600 is similar, in structure and in function, to the CFDE block 216 illustrated in FIG. 2. The CFDE block 600 includes a delta doppler block 602, an outlier rejection block 608, a first standard deviation block 620, a principal mean block 622, a second standard deviation block 630, an effective ratio check block 640 and a decision block 650. The delta doppler block 602 is coupled to the outlier rejection block 608. The first standard deviation block 620, the principal mean block 622, and the second standard deviation block 630 are coupled to the outlier rejection block 608. The effective ratio check block 640 is coupled to the first standard deviation block 620 and the second standard deviation block 630. The decision block 650 is coupled to the effective ratio check block 640 and to the principal mean block 622.

The CFDE block 600 receives a set of doppler measurements 610 (similar to the doppler measurements 210 received by the CFDE block 216). The delta doppler block 602 measures a delta doppler for the satellite at multiple time instants to generate a plurality of delta dopplers ($d\dot{\rho}(N \times 1)$) 606. The measurement of delta doppler of a satellite, in one version, is measured from a difference between two doppler measurements illustrated in equation 1 and 2. The outlier rejection block 608 detects one or more outlier delta dopplers in the plurality of delta dopplers ($d\dot{\rho}(N \times 1)$) 606. The outlier rejection block 608 also eliminates the one or more outlier delta doppler in the plurality of delta dopplers (dṗ(N×1) 606. The principal mean block 622 measures a principal mean ($\hat{a}_c$) 632 of remaining delta dopplers obtained after eliminating the one or more outlier delta dopplers from the plurality of delta dopplers (dṗ(N×1) 606. If N' is a number of remaining delta dopplers from remaining satellites, the principal mean ($\hat{a}_c$) 632 of the remaining delta dopplers (dṗ(N'×1) 614 is defined in equation 11.

The first standard deviation block 620 measures a first standard deviation ($\hat{\sigma}_a^2$) 634 and the second standard deviation block 630 measures a second standard deviation ($\hat{\sigma}_b^2$) 638, which are respectively defined in equations 12 and 13. The effective ratio check block 640 measures an effective ratio, which is defined in equation 14. The effective ratio (as defined in equation 14) is compared to a first threshold in the decision block 650. The decision block 650 generates the principal mean ($\hat{a}_c$) 632 as an averaged delta doppler 660 when the effective ratio is greater than the first threshold. The averaged delta doppler 660 is a measurement of drift in clock frequency in the clock CLK 118 and is given by value of the principal mean ($\hat{a}_c$) 632.

FIG. 7 illustrate an outlier rejection block 700, according to an embodiment. The outlier rejection block 700 is similar, in connection and operation, to the outlier rejection block 608 illustrated in FIG. 6. The outlier rejection block 700 includes a mean outlier identification block 702, a primary standard deviation block 710, a secondary standard deviation block 714, a data ratio check block 720 and an outlier elimination block 722. The secondary standard deviation block 714 is coupled to the mean outlier identification block 702. The data ratio check block 720 is coupled to the primary standard deviation block 710 and the secondary standard deviation block 714. The outlier elimination block 722 is coupled to the data ratio check block 720.

Similar to the outlier rejection block 608, the outlier rejection block 700 receives a plurality of delta dopplers (dṗ(N×1) 706. Each of the mean outlier identification block 702, the primary standard deviation block 710 and the secondary standard deviation block 714 receive the plurality of delta dopplers (dṗ(N×1) 706. The mean outlier identification block 702 measures a mean of the plurality of delta dopplers (dṗ(N×1) 706 as defined in equation 5. The mean outlier identification block 702 also measures a difference in each delta doppler and the mean of the plurality of delta dopplers (dṗ(N×1) 706. A delta doppler dṗ(k) 708 for which the difference is maximum is identified by the mean outlier identification block 702 and is defined as in equation 7.

The delta doppler dṗ(k) 708 for which the difference is maximum is provided to the secondary standard deviation block 714. The secondary standard deviation block 714 measures a secondary standard deviation 8$a$ 718 of the plurality of delta dopplers (dṗ(N×1) 706 excluding the delta doppler dṗ(k) 708 for which the difference is maximum. The secondary standard deviation $\hat{\sigma}_2^2$ 718 is defined in equation 8. The primary standard deviation block 710 measures a primary standard deviation $\hat{\sigma}_1^2$ 712 of the plurality of delta dopplers (dṗ(N×1) 706 as defined in equation 6. The data ratio check block 720 measures a data ratio from the primary standard deviation $\hat{\sigma}_1^2$ 712 and the secondary standard deviation $\hat{\sigma}_2^2$ 718. The data ratio is defined by equation 10. The outlier elimination block 722 compares the data ratio to a second threshold. The delta doppler for which the difference is maximum is marked as an outlier delta doppler, when the data ratio is greater than the second threshold. Thus, delta doppler dṗ(k) is eliminated. The outlier rejection block 700 repeats the above process to eliminate other outlier delta dopplers until the data ratio is less than the second threshold. Thus, the outlier rejection block 700 detects one or more outlier delta dopplers in the plurality of delta dopplers (dṗ(N×1) 706. The outlier rejection block 700 also eliminates the one or more outlier delta doppler in the plurality of delta dopplers (dṗ(N×1) 706. If N' is a number of remaining delta dopplers from remaining satellites, the remaining delta dopplers (dṗ(N'×1) 724 is generated by the outlier rejection block 700.

FIG. 8 illustrate an adaptive block 800, according to an embodiment. The adaptive block 800 is similar, in structure and in function, to the adaptive block 226 illustrated in FIG. 2. The adaptive block includes a square block 812, a multiplier 816 and an adder 818. The multiplier 816 is coupled to the square block 812, and the adder 818 is coupled to the multiplier 816. The adaptive block 800, similar to the adaptive block 226, receives an averaged delta doppler ($\hat{a}_c$) 802 from a CFDE block (similar to the CFDE block 216 illustrated in FIG. 2). The square block 812 performs a squaring function on the averaged delta doppler ($\hat{a}_c$) 802. The multiplier 816 performs multiplication of the squared averaged delta doppler ($\hat{a}_c$) 802 with a constant k 806. The adder 818 adds the output of the multiplier 816 and a nominal process noise parameter Qnom 810 to generate a process noise parameter Q 820. A value of the nominal process noise parameter Qnom 810, in one example, is stored in the adaptive block 800. The process noise parameter Q 820 is thus defined as:

$$Q = Q\text{nom} + k|(\hat{a}_c)|^2$$

The nominal process noise parameter Qnom 810, in one example, is associated with the two states of the clock, one for clock time bias parameter (cb) and another for clock frequency bias parameter (cd). The process noise parameter Q 820 generated by the adaptive block 800 is used to modulate the clock states to enable improved estimation of the position and velocity of the user.

Modifications are possible in the described embodiments, and other embodiments are possible, within the scope of the claims.

What is claimed is:

1. A GNSS receiver comprising:
   a measurement engine configured to receive a clock and an input signal including a plurality of satellite signals, the measurement engine configured to generate a set of doppler measurements and a set of pseudo ranges in response to the input signal and the clock;
   a clock frequency drift estimation (CFDE) block configured to:
   receive the set of doppler measurements;
   detect one or more outlier delta dopplers in a plurality of delta dopplers, delta doppler is a difference between a doppler measurement of a first satellite at a first time instant and the doppler measurement of the first satellite at a second time instant;
   eliminate the one or more outlier delta dopplers in the plurality of delta dopplers;
   estimate a principal mean of remaining delta dopplers obtained after eliminating the one or more outlier delta dopplers from the plurality of delta dopplers;
   estimate a first standard deviation from the remaining delta dopplers;
   estimate a second standard deviation from the remaining delta dopplers and the principal mean;
   generate an averaged delta doppler based on the principal mean, the first standard deviation and the second standard deviation; and a position estimation engine configured to estimate a position and velocity of a user based on the set of doppler measurements, the set of pseudo ranges and the averaged delta doppler.

2. The GNSS receiver of claim 1, wherein the CFDE block is configured to:
    estimate an effective ratio from the first standard deviation and the second standard deviation;
    compare the effective ratio with a first threshold; and
    generate the principal mean as the averaged delta doppler when the effective ratio is greater than the first threshold.

3. The GNSS receiver of claim 1, wherein to detect a first outlier delta doppler of the one or more outlier delta dopplers, the CFDE block is configured to:
    estimate a primary standard deviation and a mean of the plurality of delta dopplers;
    estimate a difference in each delta doppler and the mean of the plurality of delta dopplers; and
    identify a delta doppler of the plurality of delta dopplers for which the difference is maximum.

4. The GNSS receiver of claim 3, wherein to eliminate the one or more outlier delta dopplers in the plurality of delta dopplers, the CFDE block is configured to:
    estimate a secondary standard deviation of the plurality of delta dopplers excluding the delta doppler for which the difference is maximum;
    estimate a data ratio from the primary standard deviation and the secondary standard deviation;
    compare the data ratio and a second threshold; and
    mark the delta doppler for which the difference is maximum as an outlier delta doppler, when the data ratio is greater than the second threshold.

5. The GNSS receiver of claim 4, wherein the CFDE block is configured to detect a second outlier delta doppler of the one or more outlier delta dopplers when the data ratio is greater than the second threshold.

6. The GNSS receiver of claim 4, wherein the CFDE block is configured to compare the effective ratio to the first threshold when the data ratio is less than the second threshold.

7. The GNSS receiver of claim 1 further comprising an adaptive block coupled to the CFDE block, the adaptive block configured to generate a process noise parameter in response to the averaged delta doppler.

8. A method comprising:
    generating a set of doppler measurements and a set of pseudo ranges by a measurement engine in response to an input signal and a clock, the input signal includes a plurality of satellite signals;
    receiving the set of doppler measurements in a CFDE block;
    detecting one or more outlier delta dopplers in a plurality of delta dopplers, delta doppler is a difference between a doppler measurement of a first satellite at a first time instant and the doppler measurement of the first satellite at a second time instant;
    eliminating the one or more outlier delta dopplers in the plurality of delta dopplers;
    estimating a principal mean of remaining delta dopplers obtained after eliminating the one or more outlier delta dopplers from the plurality of delta dopplers;
    estimating a first standard deviation from the remaining delta dopplers;
    estimating a second standard deviation from the remaining delta dopplers and the principal mean;
    generating an averaged delta doppler based on the principal mean, the first standard deviation and the second standard deviation; and
    estimating a position and velocity of a user by a position estimation engine based on the set of doppler measurements, the set of pseudo ranges and the averaged delta doppler.

9. The method of claim 8 further comprising:
    estimating an effective ratio from the first standard deviation and the second standard deviation;
    comparing the effective ratio with a first threshold; and
    generating the principal mean as the averaged delta doppler when the effective ratio is greater than the first threshold.

10. The method of claim 9, wherein detecting a first outlier delta doppler of the one or more outlier delta dopplers further comprises:
    estimating a primary standard deviation and a mean of the plurality of delta dopplers;
    estimating a difference in each delta doppler and the mean of the plurality of delta dopplers; and
    identifying a delta doppler of the plurality of delta dopplers for which the difference is maximum.

11. The method of claim 10, wherein eliminating the one or more outlier delta dopplers further comprises:
    estimating a secondary standard deviation of the plurality of delta dopplers except the delta doppler for which the difference is maximum;
    estimating a data ratio from the primary standard deviation and the secondary standard deviation;
    comparing the data ratio and a second threshold; and
    marking the delta doppler for which the difference is maximum as an outlier delta doppler, when the data ratio is greater than the second threshold.

12. The method of claim 11 further comprising detecting a second outlier delta doppler of the one or more outlier delta dopplers when the data ratio is greater than the second threshold.

13. The method of claim 12 further comprising comparing the effective ratio to the first threshold when the data ratio is less than the second threshold.

14. The method of claim 8 further comprising generating a process noise parameter in response to the averaged delta doppler.

15. A computing device comprising:
    a processing unit;
    a memory module coupled to the processing unit; and
    a GNSS receiver coupled to the processing unit and the memory module, the GNSS receiver comprising:
        a measurement engine configured to receive a clock and an input signal including a plurality of satellite signals, the measurement engine configured to generate a set of doppler measurements and a set of pseudo ranges in response to the input signal and the clock;
        a clock frequency drift estimation (CFDE) block configured to:
            receive the set of doppler measurements;
            detect one or more outlier delta dopplers in a plurality of delta dopplers, delta doppler is a difference between a doppler measurement of a first satellite at a first time instant and the doppler measurement of the first satellite at a second time instant;
            eliminate the one or more outlier delta dopplers in the plurality of delta dopplers;

estimate a principal mean of remaining delta dopplers obtained after eliminating the one or more outlier delta dopplers from the plurality of delta dopplers;

estimate a first standard deviation from the remaining delta dopplers;

estimate a second standard deviation from the remaining delta dopplers and the principal mean;

generate an averaged delta doppler based on the principal mean, the first standard deviation and the second standard deviation; and a position estimation engine configured to estimate a position and velocity of a user based on the set of doppler measurements, the set of pseudo ranges and the averaged delta doppler.

\* \* \* \* \*